UNITED STATES PATENT OFFICE.

OTTOKAR SERPEK, OF MADULEIN, SWITZERLAND.

METHOD OF PRODUCING ALUMINUM NITRIDS.

No. 867,615.    Specification of Letters Patent.    Patented Oct. 8, 1907.

Application filed June 19, 1906. Serial No. 322,448. (Specimens.)

*To all whom it may concern:*

Be it known that I, OTTOKAR SERPEK, a subject of the Emperor of Austria, residing at Madulein, Switzerland, have invented a new and useful Method of Producing Aluminum Nitrids, of which the following is a specification.

My invention relates to the manufacture of aluminum nitrids which present the feature that their nitrogen can be easily split off as ammonia. One part of the nitrogen is already given off at the air, a further part by boiling with water and the remainder, if the boiling takes place at a temperature above 100° centigrade *i. e.* under pressure. From this behavior I conclude that the product obtained is not a homogeneous one. It is thus as yet impossible to give its correct chemical formula and it is only safe to say that the latter must be $Al_nN_m$, whereby it is indicated that the relation of Al and N may vary.

My new method may be carried out in several modes which, however, have the common point that the aluminum nitrids are obtained from aluminum carbid, which is employed as an initial material. In one instance I powder aluminum carbid, heat it in a suitable heating apparatus to a good red heat and conduct a current of nitrogen or of a gas containing nitrogen, as for example air, over it. Thus, under an increase of volume, aluminum nitrid is formed. The nitrogen will be absorbed more readily and easily and in a greater quantity, if a diluent substance, such as carbon or alumina or aluminum chlorid or a mixture of any two of them or of all these materials is added to the aluminum carbid.

In all of the modes set forth of my new method an acid gas, as hydrochloric acid or sulfur dioxid is advantageously added to the nitrogen, whereby the formation of aluminum nitrids is facilitated.

A suitable mixture of aluminum carbid, alumina and carbon is one which contains 20% of aluminum carbid. As an addition to the nitrogen quite small quantities of hydrochloric acid or sulfurous acid are sufficient; for instance the nitrogen may have 0.1% of the acid gas. Aluminum chlorid is sufficiently present in an admixture of 1%. These quantities, however, are given by way of example and not as exactly limiting the proportions.

I claim:

1. The method of producing aluminum nitrids, which consists in heating aluminum carbid in an atmosphere containing nitrogen to red heat.

2. The method of producing aluminum nitrids, which consists in heating a mixture of aluminum carbid and a diluent substance in an atmosphere containing nitrogen to red heat.

3. The method of producing aluminum nitrids, which consists in heating aluminum carbid in an atmosphere containing nitrogen and an acid gas to red heat.

OTTOKAR SERPEK.

Witnesses:
J. T. SABULEIN,
AUGUST GJAST.